(12) United States Patent
Koelblinger

(10) Patent No.: US 6,260,424 B1
(45) Date of Patent: *Jul. 17, 2001

(54) STAND FREE MULTI-BEAMED LOAD CELL

(76) Inventor: Brad C. Koelblinger, 1302 Little Fawn, Fairfield, IA (US) 52556

( * ) Notice: Subject to any disclaimer, the term of this patent is extended or adjusted under 35 U.S.C. 154(b) by 0 days.

This patent is subject to a terminal disclaimer.

(21) Appl. No.: 09/080,988

(22) Filed: May 19, 1998

Related U.S. Application Data

(63) Continuation-in-part of application No. 08/592,865, filed on Jan. 24, 1996, now Pat. No. 5,752,498, which is a continuation-in-part of application No. 08/319,935, filed on Oct. 7, 1994, now Pat. No. 5,546,926.

(51) Int. Cl.$^7$ ........................................................ G01L 1/04
(52) U.S. Cl. ....................................................... 73/862.632
(58) Field of Search .................... 73/862.632, 862.633, 73/862.635, 862.634, 862.637–862.639, 862.642; 77/211

(56) References Cited

U.S. PATENT DOCUMENTS

| | | | |
|---|---|---|---|
| 2,995,034 | * | 8/1961 | Boiten ............................. 73/862.635 |
| 3,033,034 | * | 5/1962 | Ziggel ......................... 73/862.635 X |
| 3,315,203 | * | 4/1967 | Jacobson .................................. 338/5 |
| 3,439,761 | * | 4/1969 | Laimins ...................... 73/862.634 X |
| 4,283,941 | * | 8/1981 | Kutsay ................................ 73/862.66 |
| 4,285,234 | * | 8/1981 | Basily et al. ..................... 73/862.635 |
| 4,549,439 | * | 10/1985 | Keen et al. ....................... 73/862.627 |
| 5,199,518 | * | 4/1993 | Woodle ....................... 73/862.627 X |
| 5,199,519 | * | 4/1993 | Polaert et al. .............. 73/862.627 X |
| 5,228,527 | * | 7/1993 | Kroll et al. ................. 73/862.627 X |
| 5,232,064 | * | 8/1993 | Kroll et al. ................. 73/862.627 X |
| 5,458,566 | * | 10/1995 | Herrig et al. .............. 73/862.634 X |

* cited by examiner

Primary Examiner—Max Noori
Assistant Examiner—Jewel V. Thompson
(74) Attorney, Agent, or Firm—Sheldon H. Parker

(57) ABSTRACT

The stand free multi-beamed load cell for accurately monitoring and registering weight changes has at multiple beams secured to one another to form a polygon rim with an open center. Multiple tabs are equally spaced from one another along the rim to receive securing members to secure the rim to a support surface. Each tab has a pair of balancing members on either side of the securing member to maintain the rim above the support surface. At least one of the beams has a bridge to reduce the depth of the beam to enable flexing under application of the weight. A strain gage proximate the bridge registers the flexing of the beams, sending the signals through an electronic connector to a control means. The balance members serve to minimize the deflection on the rim approximate the tabs, creating maximum strain level at the bridge. The tabs and balance members further serve to accommodate for any variations in the support surface.

14 Claims, 11 Drawing Sheets

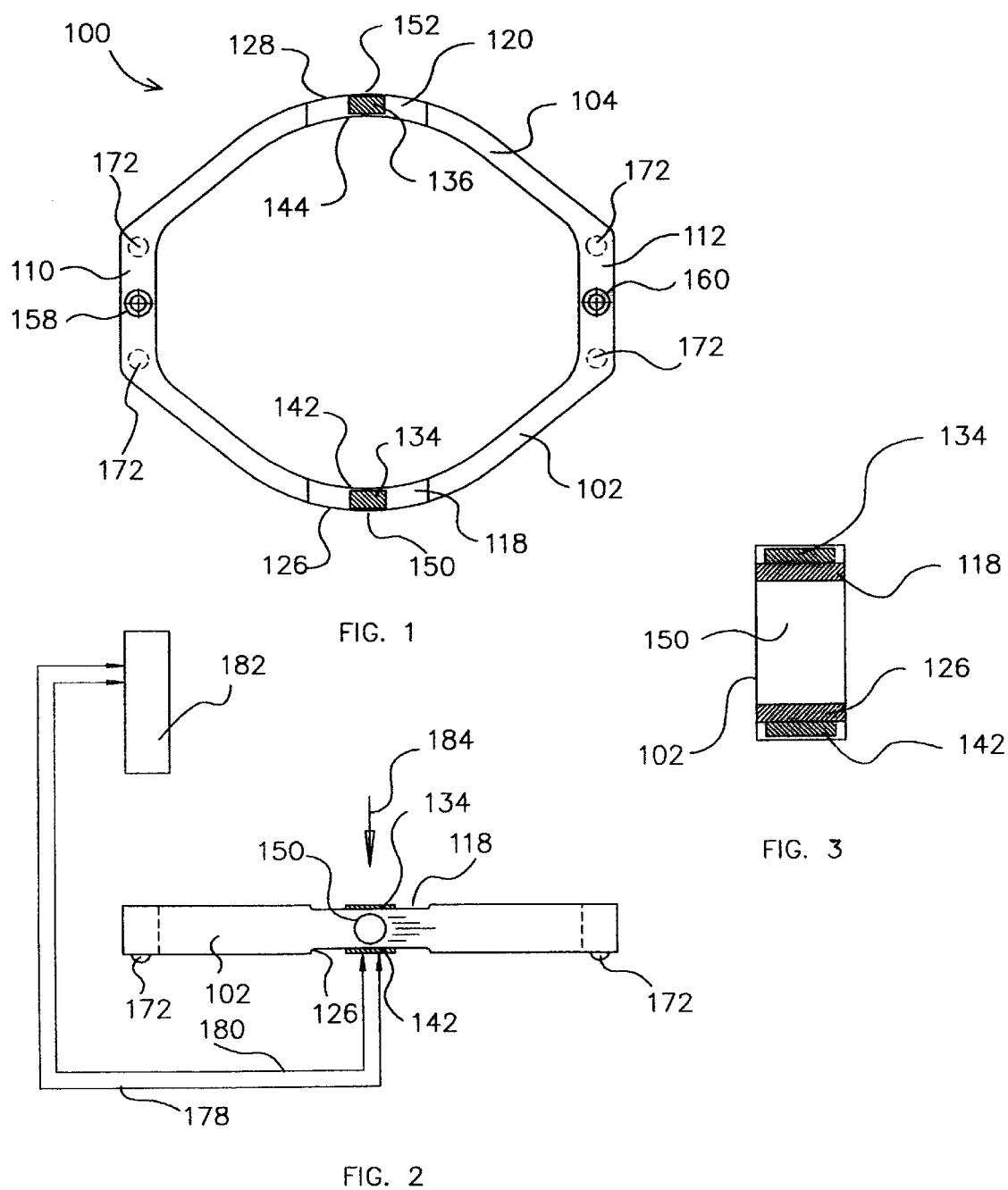

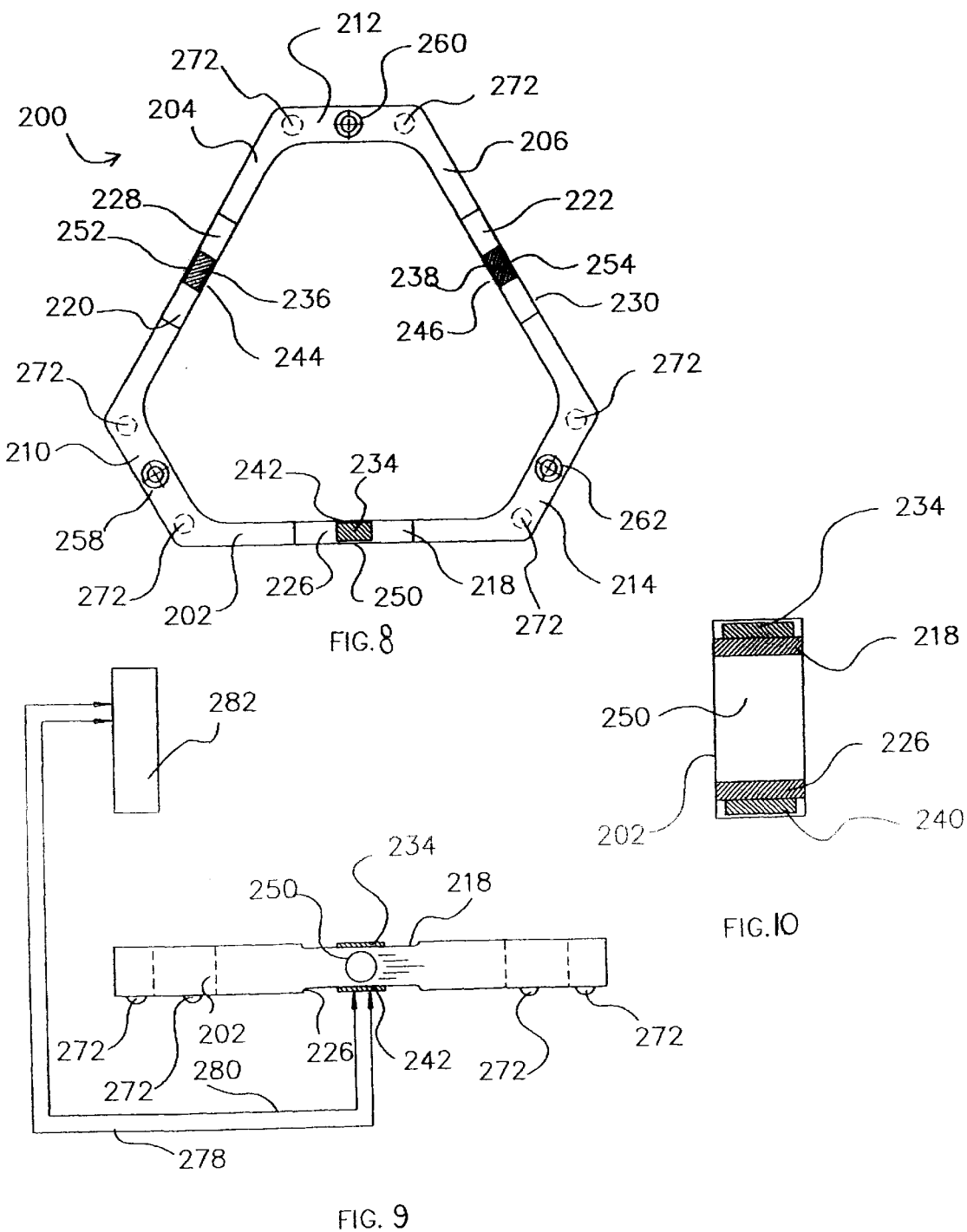

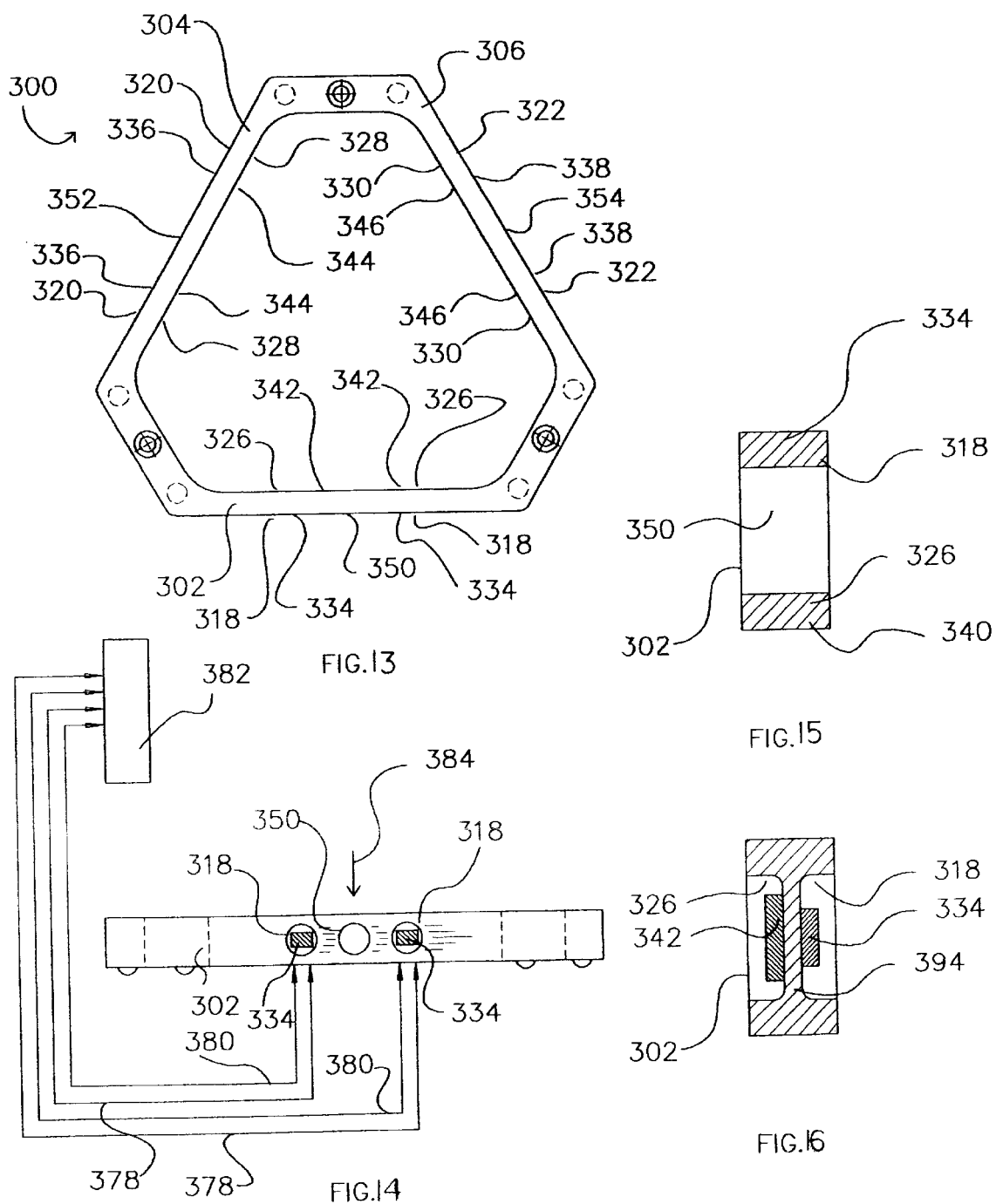

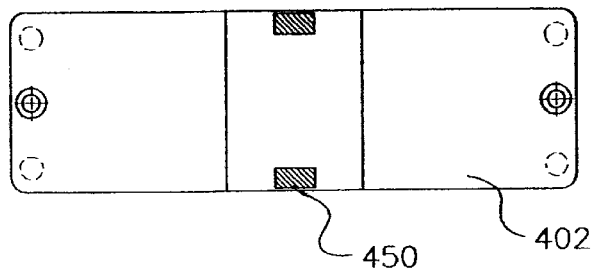
FIG.17
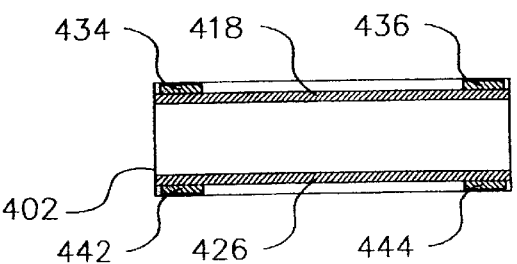
FIG.19
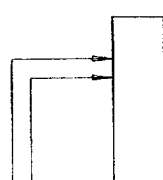
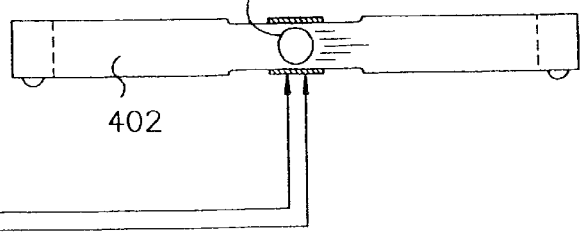
FIG.18

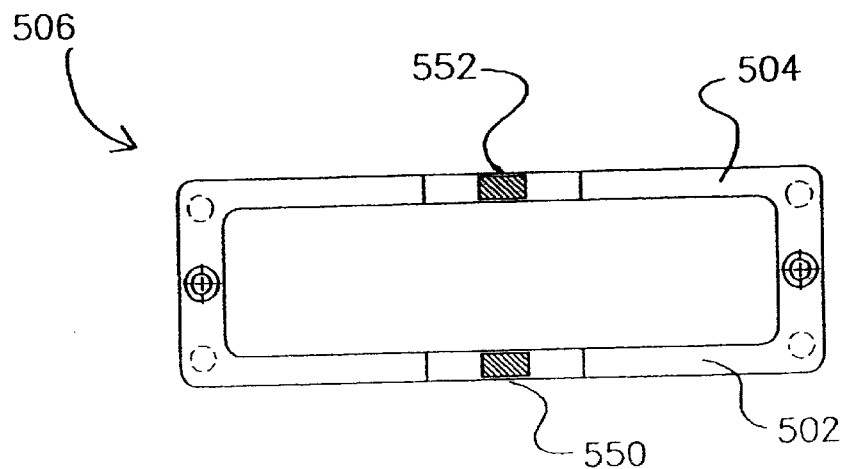
FIG.20
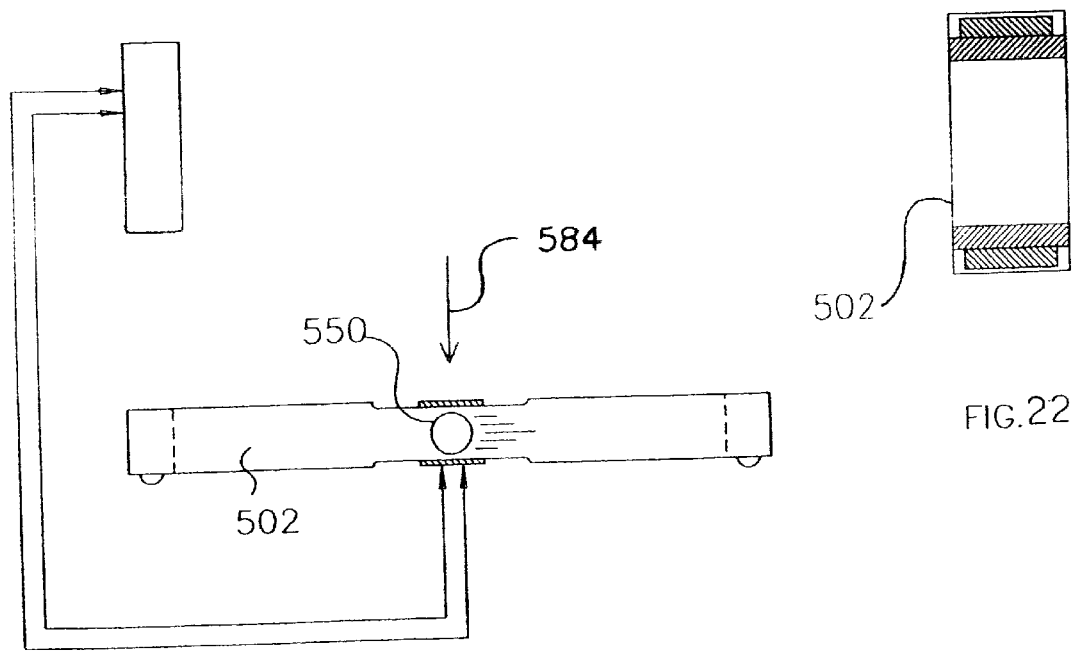
FIG.21
FIG.22

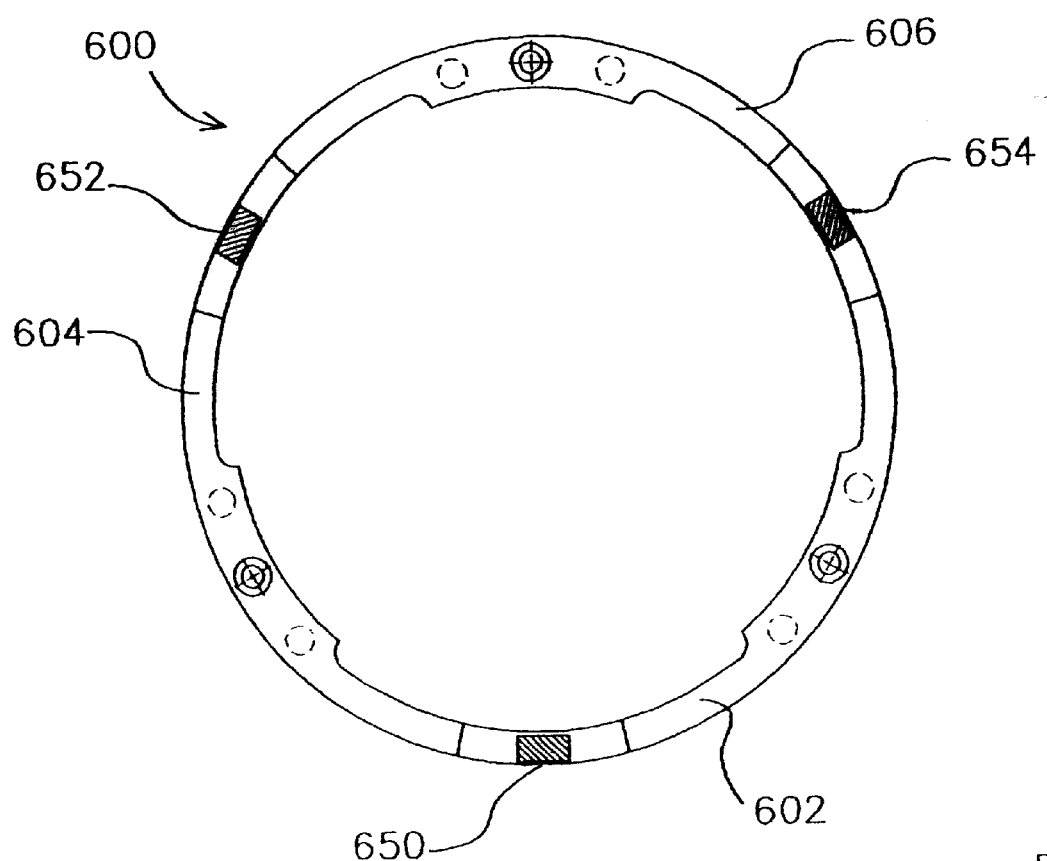
FIG.23
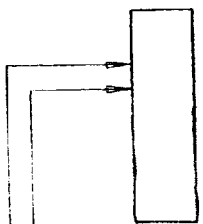
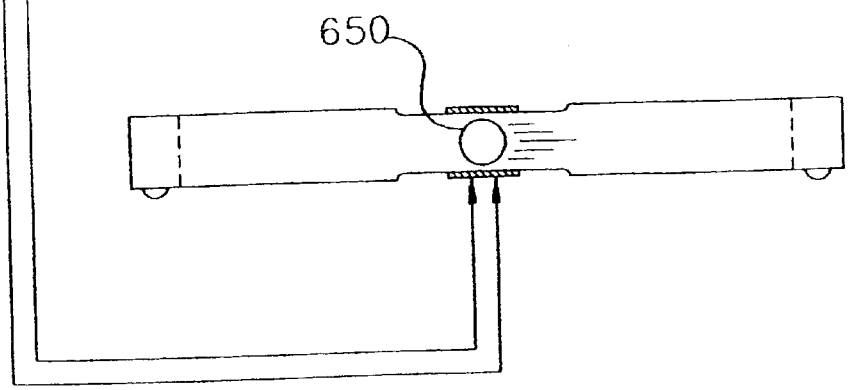
FIG.24
FIG.25

STAND FREE MULTI-BEAMED LOAD CELL

CROSS REFERENCE TO PRIOR APPLICATIONS

This application is a continuation-in-part of U.S. patent application 08/592,865 filed Jan. 24, 1996, now U.S. Pat. No. 5,752,498, which is a continuation-in-part of U.S. Ser. No. 08/319,935 filed Oct. 7, 1994 now U.S. Pat. No. 5,546,926 which are incorporated herein recited in full.

BACKGROUND OF THE INVENTION

1. Field of the Invention

This invention relates to stand free multi-beamed load cells.

2. Brief Description of the Prior Art

As stated in Strain Gage Based Transducers, 1988 by Measurements Group, Inc., which is incorporated herein as though recited in full, for certain types of applications, the characteristics of the straight cantilever beam can be improved upon. The improvement can be by designs which induce "multiple bending" (reversed curvature) in the beam element. The potential advantages of a beam which is built-in at both ends, and loaded at the center include; intrinsic stiffness and straining line motion of the point of load application as the beam deflects. The spring element also lends itself to relatively easy installation of a full bridge strain gage circuit on the upper surface of the beam. Some degree of non linearity in output can be expected, however, because of the membrane stress produced in the beam (as it deflects) by the rigidly spaced end supports. Additionally, as for most flexural spring elements, it is necessary to vary the section modulus of the beam along its length if the strain gages are to lie in nearly uniform strain fields.

An alternative configuration, a spring element has generally the same bending moment distribution and deflection pattern and retains essentially the same advantages except that the compliance is twice as great if the dimensions are otherwise the same. Because the end restraints are free to move laterally as the upper and lower beams deflect, the membrane stress is eliminated. Any such motion, however, represents a small change in the moment arm of the applied load, which can manifest itself in the form of non-linear response if the ration of the deflection to the beam length is great enough.

Pairs of strain gages are mounted side-by-side on one surface of the beam, or back-to-back on opposite surfaces, to implement a full bridge circuit. The design is sensitive to both the location and direction of the applied load. To function properly, the design must incorporate features to assure that loading can occur only along the intended axis.

A significantly improved form, where the load sensing is accomplished with two beams, joined by relatively massive sections at both ends. With this configuration, externally applied couples are counteracted by axial forces in the sensing beams, minimizing the effects of off-axis loads. One of the drawbacks of the design is its excessive compliance. The deflection which takes place in the beam segments between gage locations not only increases the compliance of the unit, but also degrades the linearity. Better load cell performance can be obtained by either shortening the beams or increasing the beam thickness between gage sites. Such design changes should be made with full consideration of the shear load which must be borne by the element. Strain gage installation and inspection are more difficult when gages are located inside of a hole.

Various forms of the coupled dual-beam arrangement are widely used in load cells for weighing applications.

Another type of bending spring element is the ring. The ring shaped element also has a long, classical history in measurement technology, stemming from the well known Morehouse proving ring, once universally used to calibrate materials testing machines. Although ring type spring elements always involve bending, direct stress is also intrinsic to the configuration, and the combination of the resulting two deformation modes provide the primary distinction from pure beams.

In a basic ring design, the strain distribution in the ring is a complex function of the geometry, and is significantly affected by the design details of the bosses. The bending moment does not vary significantly in the region of the horizontal diameter, the strain distribution is nearly uniform in this area.

The squared ring is easier, less costly to fabricate, decreases the compliance of the spring element, and correspondingly improves the linearity. At the same time, the flexural stiffness at the junctures of the bosses and the ring has been reduced to minimize the sensitivity of the element to off axis load components. There are countless other designs based on the presence of a stress concentrating hole and/or lateral notches in an axially loaded member. A representative configuration, taken from U.S. Pat. No. 3,315,203.

In adapting the ring concept to different load cell specifications for capacity, physical size, etc., the designs sometimes deviate so far from a conventional ring in appearance that their classification as such becomes arguable.

The evolution of beam type load cells has been traced from the basic cantilever beam, through a number of refinements, to a variety of more sophisticated forms with generally superior properties. Multiple beam spring elements are currently very popular, and can be found in many commercial transducers, particularly in low capacity units. It is the need for this last qualifier which leads to the subject matter of the present section.

Although multiple beam designs have good overall characteristics, including linearity and insensitivity to point of load application, they do not lend themselves well to being scaled up for higher load cell capacities. As the capacity of the load cell rises, so does the size of the spring element, along with its mass and, usually, its deflection at rated load. Because of these considerations, spring elements based on the measurement of bending strains are not commonly used in load cells with capacities greater than about 1000 lb. Instead, transducer designers ordinarily turn to one of two other configurations, the shear web or column, to achieve very high capacities in compact, low compliance spring elements.

One of the advantages of the shear web spring elements is its low sensitivity to variations in the point of load application. Static equilibrium considerations decree that the vertical shear force on every section of the beam to the right of the load be the same, and exactly equal to the applied load. Thus the shear in the web should be independent of the point of load application (along the beam centerline), as long as the load is applied to the left of the web. If the strain gages sensed only the shear induced strains, the bridge output would be unaffected by the position of the load or by other bending moments in the vertical plane.

Since the gage grids are necessarily finite in length, however, and thus span a small distance above and below the neutral axis, their outputs are also slightly affected by the bending strains in the web. With the grids centered on the neutral axis, the tensile and compressive bending strains above and below the axis tend to be self canceling in each grid. But the cancellation is usually less than perfect because of small asymmetries in the spring element and strain gage installation.

Because of higher order effects tending to couple the shear and bending strains, it is always preferable to design the beam for the lowest practicable bending moment in the shear web. This would seem to suggest the use of very short beams, but the point of load application must be far enough away from the shear web so that the web behavior approximates the ideal described here. The bending moment at the center of the web is zero, and for a given beam length and rated capacity, the bending moment throughout the beam is halved.

Another type of shear web spring element consists of a metal block in which holes or slots have been machined to form webs subjected to direct shear under axial load. A further example is where the shear webs are produced by drilling a hole longitudinally through the beam. Strain gages oriented at +–45 degrees to the beam axis are then installed inside the hole to sense the shear force, as in U.S. Pat. No. 4,283,941.

SUMMARY OF THE INVENTION

BRIEF DESCRIPTION OF THE DRAWINGS

The advantages of the instant disclosure will become more apparent when read with the specification and the drawings, wherein:

FIG. 1 is a top view of one embodiment of the free standing elliptical beam load cell.

FIG. 2 is a front view of the free standing elliptical beam load cell and strain gage of FIG. 1;

FIG. 3 is a cross section view of the free standing elliptical beam load cell, arch bridges and strain gages;

FIG. 8 is a top view of one embodiment of the free standing triangular beam load cell;

FIG. 9 is a front view of the free standing triangular beam load cell and strain gage of FIG. 8;

FIG. 10 is a cross section view of the free standing triangular beam load cell arch bridges and strain gages;

FIG. 13 is a top view of an alternate triangular load cell;

FIG. 14 is a front view of the free standing triangular beam load cell and strain gage of FIG. 15;

FIG. 15 is a cross section view of the free standing triangular beam load cell arch bridges and strain gages;

FIG. 16 is a cross sectional view of the I-Beam configuration of the load cell of FIG. 16;

FIG. 17 is a top view of one embodiment of the free standing rectangular beam load cell;

FIG. 18 is a front view of the free standing rectangular beam load cell and strain gage of FIG. 17;

FIG. 19 is a cross section view of the free standing rectangular beam load cell arch bridges and strain gages;

FIG. 20 is a top view of another embodiment of the free standing rectangular dual beam load cell;

FIG. 21 is a front view of the free standing rectangular dual beam load cell and strain gage of FIG. 20;

FIG. 22 is a cross section view of the free standing rectangular dual beam load cell arch bridges and strain gages;

FIG. 23 is a top view of a free standing circular beam load cell;

FIG. 24 is a front view of the free standing circular beam load cell and strain gage of FIG. 23;

FIG. 25 is a cross section view of the free standing circular beam load cell arch bridges and strain gages;

DETAILED DESCRIPTION OF THE INVENTION

The prior art limitations due to mounting, applications, thermal degradation and response to non-axial loads are solved by a complete redesign of the beam load cell as disclosed herein. The unique stand free multi beamed load cell disclosed can be used as a force-sensing means for detecting load/weight or slight increments in load/weight change. The axial force applied to the disclosed stand free multi beamed load cell is either in the form of a mounted load or a suspension load. This load is applied to the center of the beam. The beam, which functions as a spring element, is supported on both ends with tabs. This can be a singular beam or consist of a dual, triple, quad or multi-number of beams. These multi-beam load cell layouts are in the form of an elliptical, rectangle, triangle, circle, square, or any other geometric shape. In this rim design of multi-beam load cells, each beam is independent of the other. A through hole for load placement is centralized on the side of each beam. The load is evenly distributed to the number of beams that make up a free standing load cell. For bending beam load cell applications, a compression strain gage is placed on the beams top bridge above the load placement hole. The tension strain gage is placed on the beams bottom bridge below the load placement hole. For shear-web beam load cell applications, a recessed hole is located to the left and to the right of the beams load placement hole on both sides of the beam. The recessed holes opposite each other creates an I-beam in that area. Strain gages are placed on the bottom of the four recessed holes. The free standing beam load cell as disclosed herein mounts in a relaxed horizontal position. Singular ball bearings or dowel pins made from hardened steel or stainless steel are protruding out of the bottom surface of the tab ends. This allows the multi-beam load cell to stand freely on a flat, stable support base. Only a point contact is made between the singular ball bearings or dowel pins and the flat, smooth support base. A shoulder bolt with a compression spring around its shoulder protrudes through a counterbored hole in the center of each tab end and is screwed into the support base. The resistance created by the compression spring keeps the support base from becoming tightly fixed to the singular ball bearings or dowel pins. This allows full flexing of the beam load cell which will minimize the deflection on the outside portions of the beam and tab ends while creating the highest strain level in the centralized area of the beam where the load is applied. This improves the performance characteristics such as linearity, hysteresis, creep/relaxation and fatigue life. Should the support base have a high or low temperature, the point contact would minimize the destabilizing temperature effects on the beam and the strain gage response.

Figure 4:
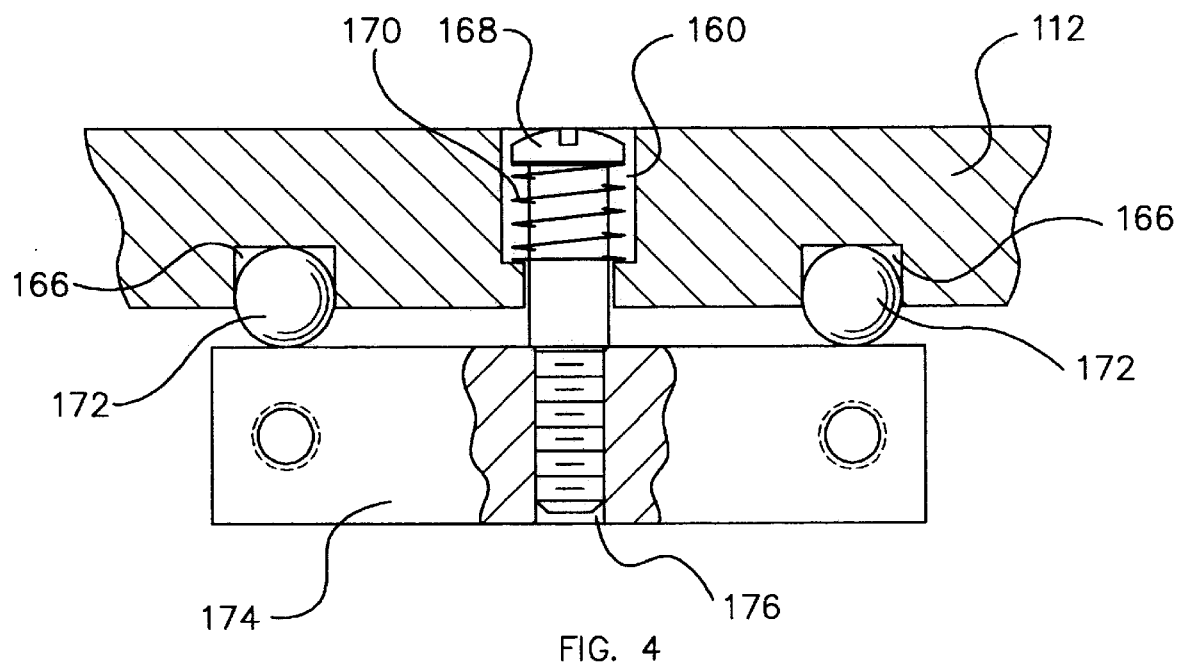
FIG. 4 is a cutaway side view of the mounting portion of the free standing elliptical beam load cell of FIG. 1.

The free standing bending beam load cell 100 in an elliptical configuration, is illustrated in FIGS. 1, 2 and 3. The optimum material for manufacturing the beam load cells disclosed herein is based on its application. For high-force beam load cells, high-modulus materials are generally used, such as steel alloys 4140 and 4340. In situations requiring corrosion resistance, stainless steel alloys 17-4PH, 17-7PH, PH 15-7 Mo and 15-5 PH are recommended. In the case of low-force applications, low-modulus materials such as the aluminum alloys 2024-T4, T351 or T81 are used. The beams 102 and 104 with tab ends 110 and 112 are machined from one piece of material in the form of a rim. If the application requires a large mounting or suspension load, each individual beam 102 and 104 could be machined separately and then attached to the individual tab ends 110 and 112 to form a rim. This would make up a beam/tab end assembly. A preferred option for large loads would be to use two or more free standing beam load cells 100. The tab ends 110 and 112 serve to support the load cell 100 on the support ledges 174 as shown in FIG. 4. Although the tab ends 110 and 112 can be either permanently or removably affixed to the support ledges 174 by various means known in the art, the preferred method is through use of ball bearings 172 in combination with shoulder bolts 168 and springs 170 positioned in the counterbored through holes 158 and 160. In certain applications, the free standing beam load cell tabs 110 and 112 do not have to be attached to the support ledges 174.

The beams 102 and 104 side centralized point is the location for machining the load placement hole 150 and 152. Tension arch bridges 126 and 128 are machined into the under surface of the beams 102 and 104, while compression arch bridges 118 and 120 are machined on top of the surface. The compression arch bridges 118 and 120, along with the tension arch bridges 126 and 128, serve to focus the flexing of beams 102 and 104 at the bridges when an axial load 184 is applied. The thickness of the load cell is reduced by approximately 60–80% at the point of the arch bridges 118, 120, 126 and 128. One of the arch bridges is equipped with a half or full Wheatstone bridge circuit, or equivalent, to provide a read out of the amount of strain currently present on the load cell 100. A basic Wheatstone bridge measuring circuit consists of two (half) or four (full) strain gage grids electronically connected and is recommended for use with the instant invention due to its accuracy and sensitivity with static strain circuits. Alternate bridge designs can be used and are disclosed further herein in FIGS. 29–33. Current is fed to the beam load cell 100 through the bridge excitation voltage line 178. The amount of load 184 placed at the center of the beam 102 and 104 varies the strain of the metal, which in turn alters the current. The change in current is registered at the Whetstone bridge 126 and fed through the bridge output voltage line 180 to the strain gage instrumentation 182. A base level strain is set at time of manufacture and a lessening of this base level indicates less weight being placed on the load cell. The electronics registering the load 184 change can be configured in any method known in the art.

In FIG. 4 the cutaway side view of the tab end 112 is shown mounted to the support ledge 174 through use of a shoulder bolt 168. The ball bearings 172 are equally spaced within the tab end 112 from the counterbored through hole 160 and screw receiving area 176. The ball bearings 172 are snapped into and maintained in the bearing receiving notch 166 by a friction fit. A threaded receiving area 176 is machined into the support ledge 174 to receive the shoulder bolt 168 and secure the beam load cell. A counterbore 160 is machined into the tab end 112 to provide a receiving area for the spring 170 and shoulder bolt head 168. The compression spring 170 has a diameter less than the machined counterbore 160 and head of the shoulder bolt 168, thereby maintaining the compression spring 170 between the head of the shoulder bolt 168 and screw receiving area 176. Tightening the shoulder bolt 168 pulls the tab 112 and the support base ledge 174 together until contact is made between the ball bearings 172 and the support base ledge 174. The resistance created by the compression spring 170 keeps the support base ledge 174 from becoming tightly fixed to the ball bearings 172. This floating adjustment will keep a twisting action off the load cell.

Figure 5:
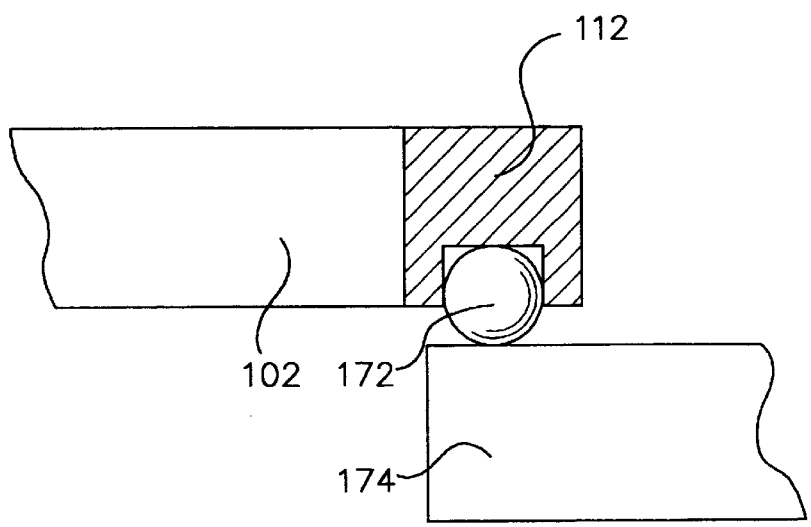
FIG. 5 is a cutaway front view of the mounting portion free standing elliptical beam load cell.
Figure 6:
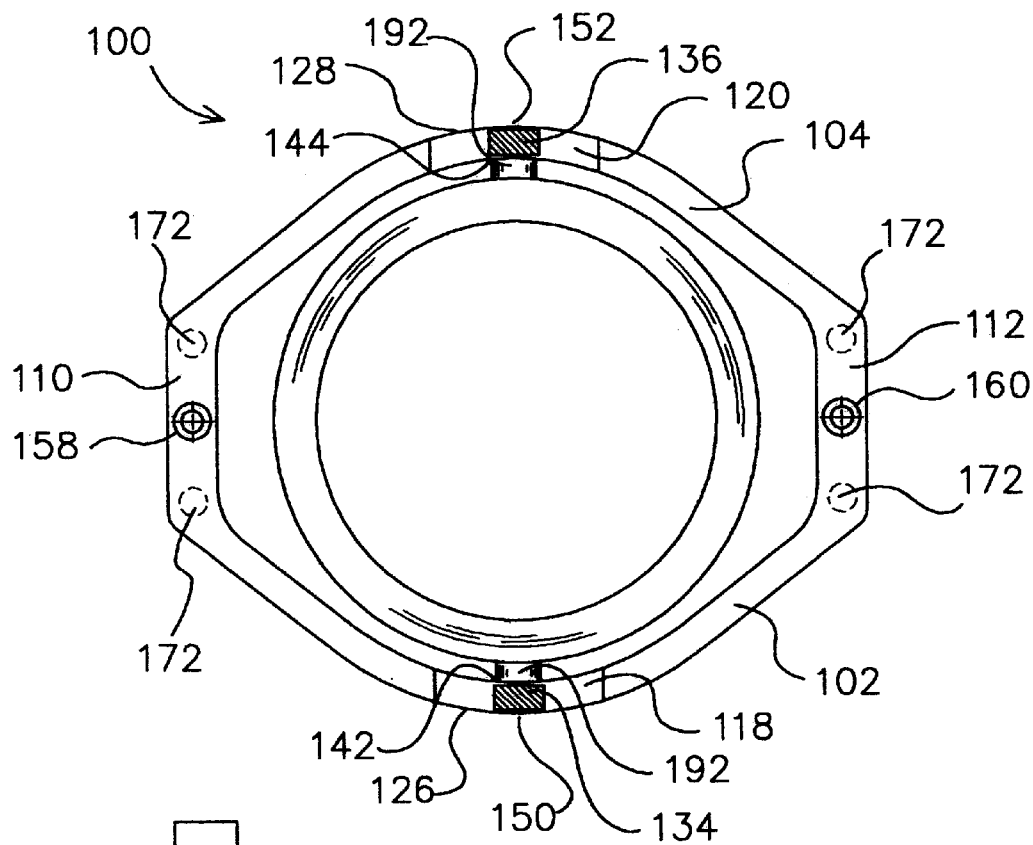
FIG. 6 is a top view of the free standing elliptical beam load with a vessel installed on it.
Figure 7:
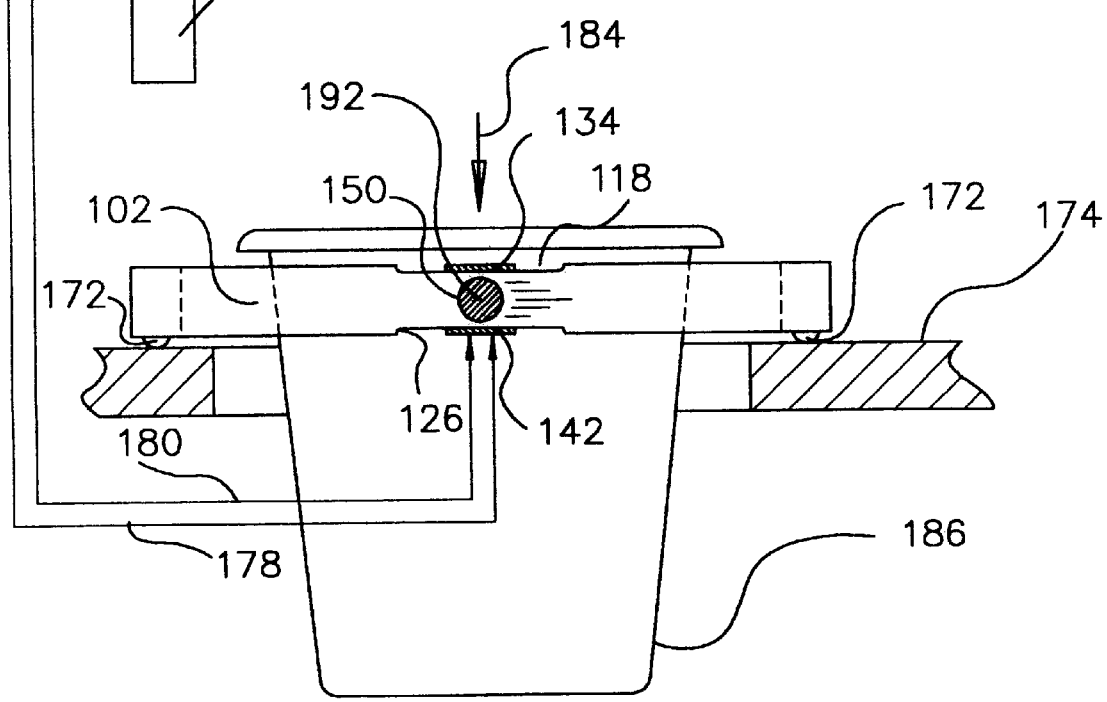
FIG. 7 is a side view of the free standing elliptical beam load cell with a vessel installed on it.

In FIG. 5 the cutaway front view shows the tab end 112 with the singular ball bearing 112 standing on the support ledge 174. If the support ledge 174 is outside normal temperature endurance for the beam 102 and strain gage (not shown) response, the point contact between the singular ball bearing 172 and the support ledge 174 minimizes the destabilizing temperature effects. The free standing elliptical beam load cell 100 is shown installed with the tab ends 110 and 120 on the support ledge 174 in FIGS. 6 and 7. This illustrates an axial load 184 held in suspension by the load cell beams 102 and 104. The vessel 186 has two load rods 192 which protrude into the load placement holes 150 and 152 in their respective beams 102 and 104. The weight in the vessel 186 can be in liquid or solid form. The load is concentrated on the two load rods 192 which press downward in the load placement holes 150 and 151. With the shoulder bolts and compression springs (not shown) in the counterbored through hole 158 and 160, the free standing beam load cell flexes on singular ball bearings 172. This allows this transfer of load on the arch bridges 118, 120, 126 and 128 to create a high level of strain which will be detected by the compression strain gages 134 and 136 and the tension strain gages 142 and 144. With this applied load 184, the current fed through the bridge excitation voltage line 178 is altered and fed back through the bridge output voltage line 180 to the strain gage instrumentation 182 for load/weight readout. Since the beams 102 and 104 are independent from each other, a means to reduce cost would be to place one full strain gage on the tension arch bridge 126. This would leave the two compression and one tension arch bridges 118, 120 and 128 vacant.

The free standing bending beam load cell 200 in a triangular configuration, is illustrated in FIGS. 8, 9, and 10.

Figure 11:
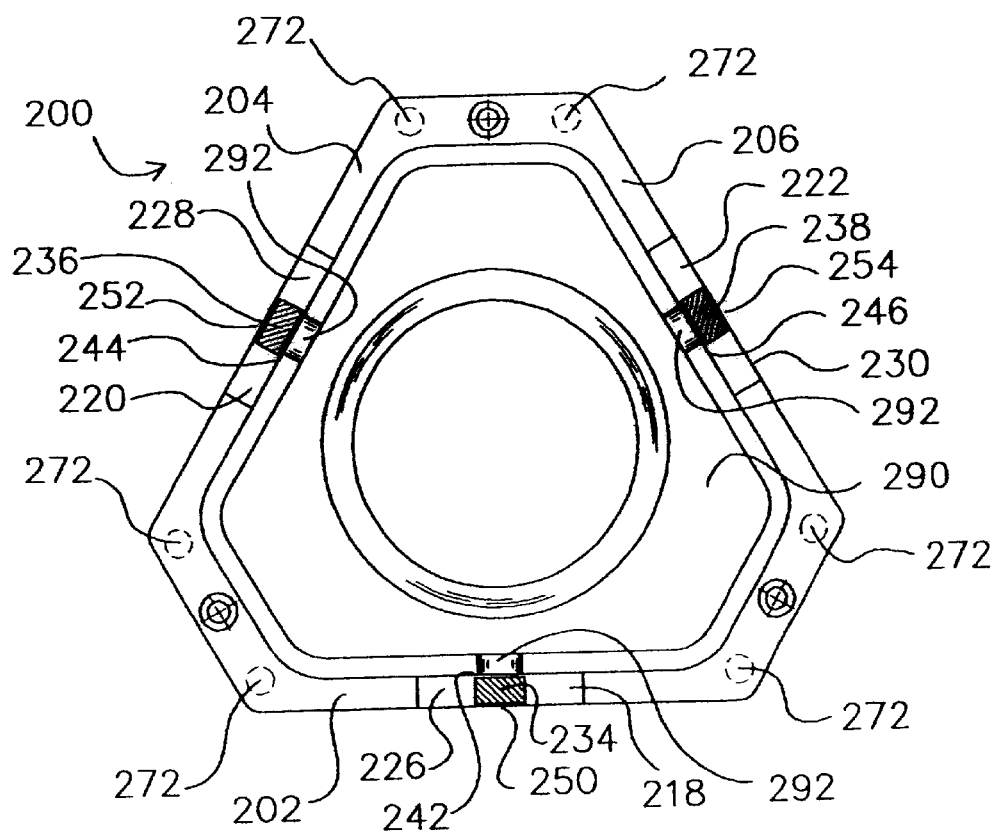
FIG. 11 is a top view of the free standing triangular beam load cell with a vessel installed on it.
Figure 12:
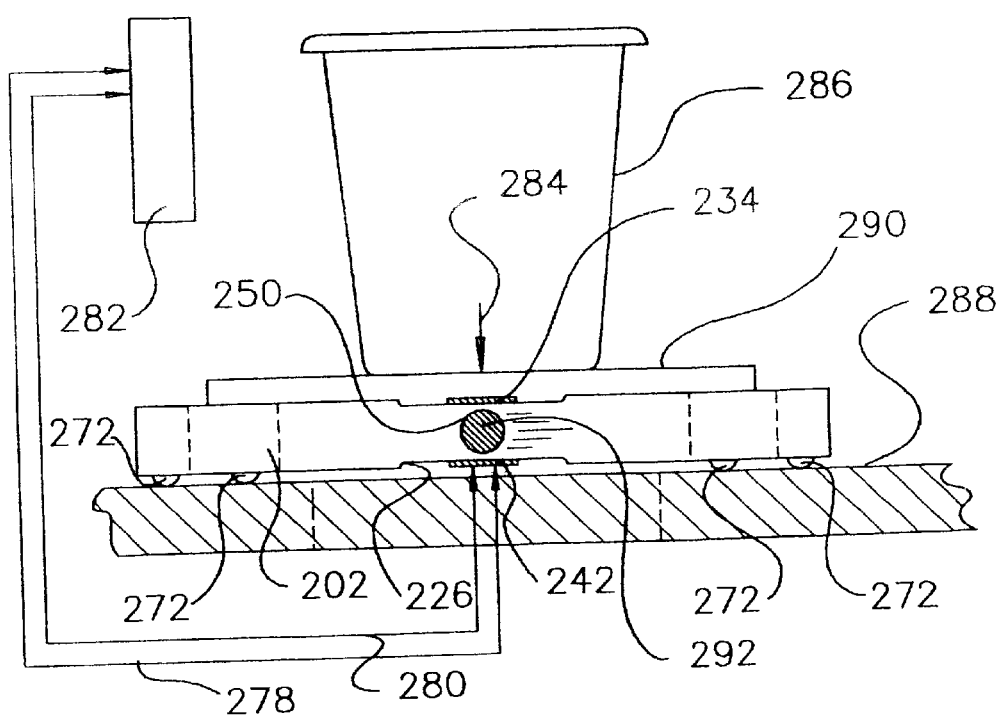
FIG. 12 is a side view of the free standing elliptical beam load cell with a vessel installed on it.

The unit has three beams 202, 204 and 206 which are one piece with the three tab ends 210, 212 and 214. The triangular beam load cell 200 is machined either from high-modulus steel for high force or from low-force applications. Each of the tab ends 210, 212 and 214 has two ball bearing receiver notches and one counterbored through hole 258, 260 and 262 respectively machined in. Ball bearings are 272 pressed into the notches and act as a pivot point to allow the beams 202, 204 and 206 to have a concentrated strain at the compression arch bridges 218, 220 and 222 as well as the tension arch bridges 226, 228 and 230. All three beams 202, 204 and 206 are independent of each other so the placement of compression strain gages can be placed on beam 202, beams 202 and 204 or beams 202, 204 and 206. The same is true with the tension strain gages 242, 244 and 246. The use of a full set of the mentioned strain gages on all three beams 202, 204 and 206 would be most efficient. The excitation voltage line 278 and bridge output voltage line 280 are connected to the strain gage instrumentation 282 which is used to calibrate the triangular beam load cell when a force is put on the load placement holes 250, 252 and 254. The free standing triangular beam load cell 200 is shown installed on the support base 288 in FIGS. 11 and 12. A load base 290 is held inside the triangular beam load cell 200 with three load rods 292 which protrude into the load placement holes 250, 252 and 254 in their respective beams 202, 204 and 206. The axial load 284 on the load base 290 is shown as a vessel 286. Any other material item can be set on the load base 290 as well. The load is concentrated on the three load rods 292 which press downward in the load placement holes 250, 252 and 254. In certain applications, its not required to use the shoulder bolt and compression spring, illustrated in FIG. 4, to hold the beam load cell in position. The unit will flex on the singular ball bearings 272. This allows the transfer of load on the arch bridges 218, 220, 222, 226, 228 and 230 to create a high strain which will be detected by the compression strain gages 234, 236 and 238 and the tension strain gages 242, 244 and 246. With this applied load, the current fed through the bridge excitation voltage line 278 is altered and fed back through the bridge output voltage line 280 to the strain gage instrumentation 182 for load/weight readout. Since the beams 202, 204 and 206 are independent from each other, a means to reduce cost would be to place one full strain gage on the tension arch bridge 226. This would leave the three compression and two tension arch bridges 218, 220, 222, 228 and 230 vacant.

FIGS. 13–16 disclose a triangular shaped multi-beamed load cell 300 having an I-Beam construction, as illustrated in FIG. 16. This construction allows for the load cell 300 to support heavy loads of greater than 1,000 pounds. The basic construction is similar to that of the foregoing load beams, however the use of the I-beam increases the weight capacity substantially.

The rectangular load cell 406 as illustrated in FIGS. 17, 18 and 19 is a free standing unit which rests on any flat surface. The solid body 402 provides an ideal surface to set miscellaneous items without the need for suspension, special cups or other devices. The shoulder bolts and compression springs (not shown) and singular ball bearings are equivalent to those described heretofore. This allows this transfer of load on the arch bridges 418 and 426 to create a high level of strain which will be detected by the compression strain gages 434 and 436 and the tension strain gages 442 and 444. With this applied load 484, the current fed through the bridge excitation voltage line is altered and fed back through the bridge output voltage line as described heretofore. Since the beams 102 and 104 are independent from each other, a means to reduce cost would be to place one full strain gage on the tension arch bridge 126. This would leave the two compression and one tension arch bridges 118, 120 and 128 vacant.

The dual beam rectangular load cell 506 as illustrated in FIGS. 20, 21 and 22 is a free standing unit allows for the hanging of devices, as previously described. The beams 504 and 502 are suspended using the shoulder bolts and compression springs (not shown) and singular ball bearings which are equivalent to those described heretofore. This allows this transfer of load on the arch bridges 504 and 502 to create a high level of strain which will be detected by the compression strain gages 518 and 526 and the tension strain gages 534 and 540. With this applied load 584, the current fed through the bridge excitation voltage line is altered and fed back through the bridge output voltage line as described heretofore. Since the beams 502 and 504 are independent from each other, a means to reduce cost would be to place one full strain gage on the tension arch bridge 552. This would leave the two compression and one tension arch bridges 552.

The multi-beamed circular load cell 600 as illustrated in FIGS. 23, 24 and 25 is a free standing unit allows for the hanging of devices, as previously described. The beams 602, 604 and 606 are suspended using the shoulder bolts and compression springs (not shown) and singular ball bearings which are equivalent to those described heretofore. This allows this transfer of load on the arch bridges 602, 604 and 506 to create a high level of strain which will be detected by the compression strain gages 640 and 634 and the tension strain gages 618 and 626. With this applied load 684, the current fed through the bridge excitation voltage line is altered and fed back through the bridge output voltage line as described heretofore. Since the beams 602, 604 and 606 are independent from each other, a means to reduce cost would be to place one full strain gage on the tension arch bridges 652. This would leave the two compression and one tension arch bridges 652.

Figures 26, 27, 28:
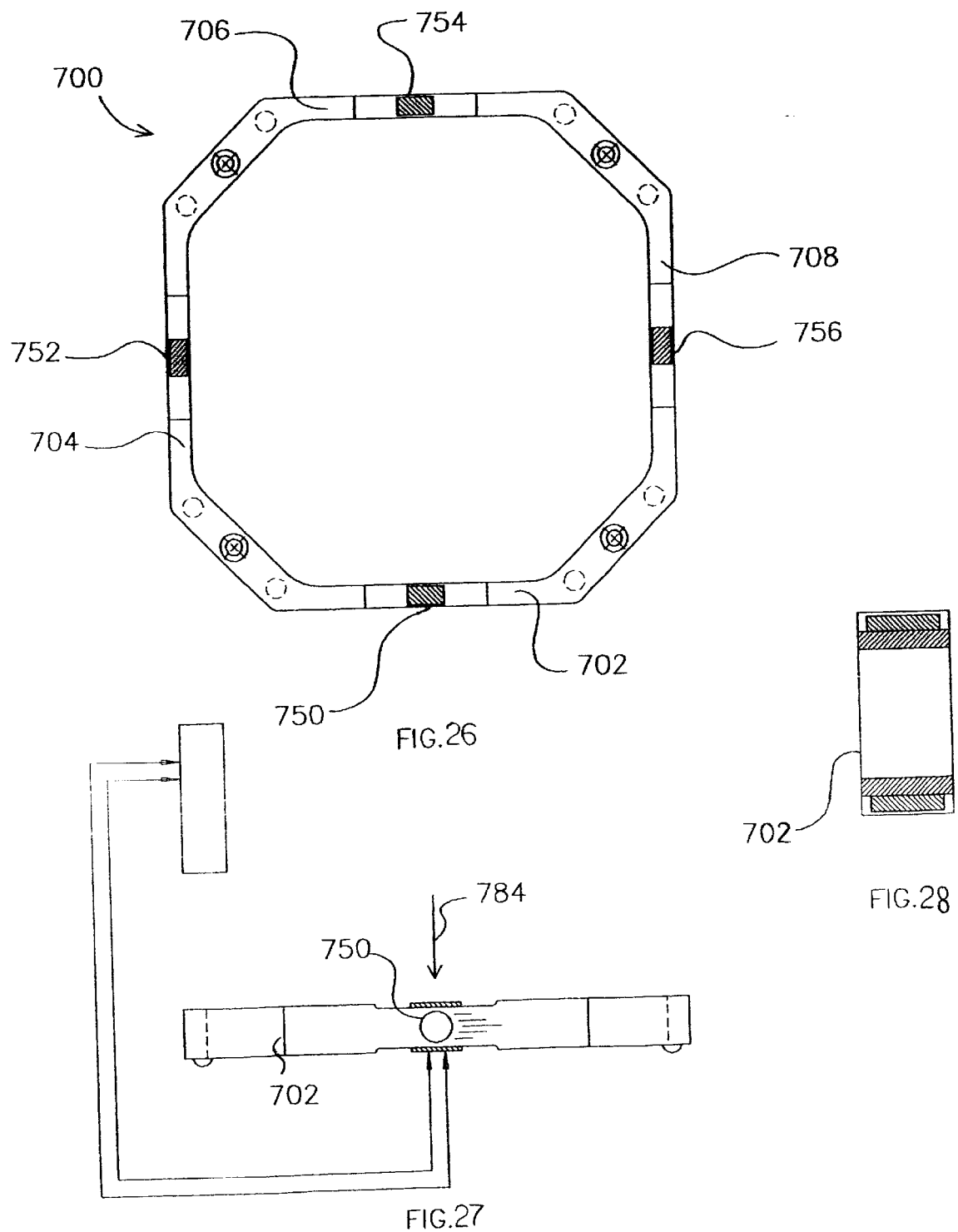
FIG. 26 is a top view of a free standing octagonal multi-beamed load cell.
FIG. 27 is a front view of the free standing octagonal multi-beamed load cell and strain gage of FIG. 26.
FIG. 28 is a side view of an alternate elliptical beam load cell with a step and strain gage bridge.

The multi-beamed hexagonal load cell 700 is illustrated in FIGS. 26, 27 and 28. The beams 702, 704, 706 and 708 are suspended using the shoulder bolts and compression springs (not shown) and singular ball bearings which are equivalent to those described heretofore. This allows this transfer of load on the arch bridges 752, 754, 756 and 750 to create a high level of strain which will be detected by the compression strain gages as described heretofore 740 and 734 and the tension strain gages 718 and 726. With this applied load 784, the current fed through the bridge excitation voltage line is altered and fed back through the bridge output voltage line as described heretofore. Since the beams 702, 704, 706 and 708 are independent from each other, a means to reduce cost would be to place one full strain gage on the tension arch bridges 752. This would leave the two compression and one tension arch bridges 752.

Figure 29:
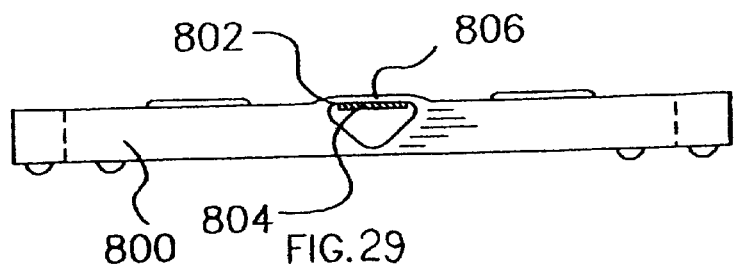
FIG. 29 is a cross section view of the free standing octagonal multi-beamed load cell arch bridges and strain gages.
Figure 30:
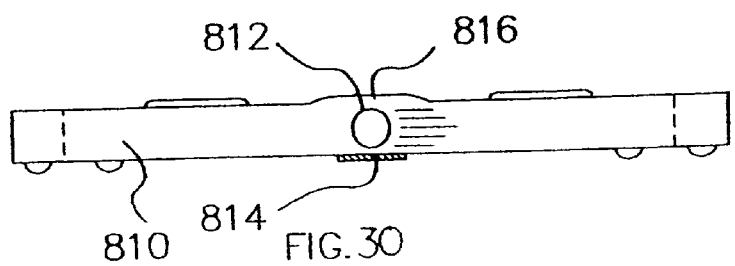
FIG. 30 is a side view of an alternate elliptical beam load cell with a step and circular strain gage cutout.
Figure 31:
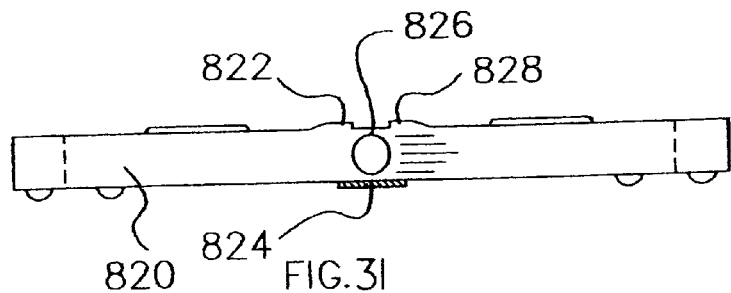
FIG. 31 is a side view of an additional elliptical beam load cell with dual steps and circular strain gage cutout.
Figure 32:
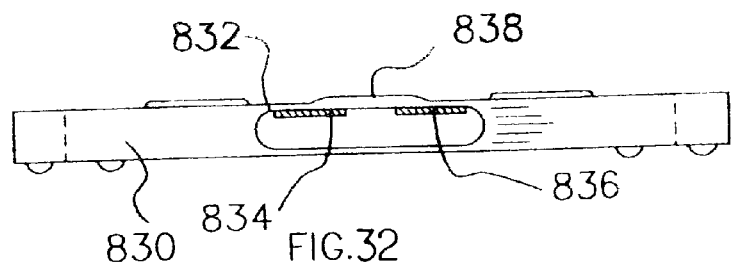
FIG. 32 is a side view of an additional elliptical beam load cell with singular step, oval cutout and dual strain gage sets; and, FIG. 33 is a side view of an additional elliptical beam load cell with dual cutouts and strain gage sets.
Figure 33:
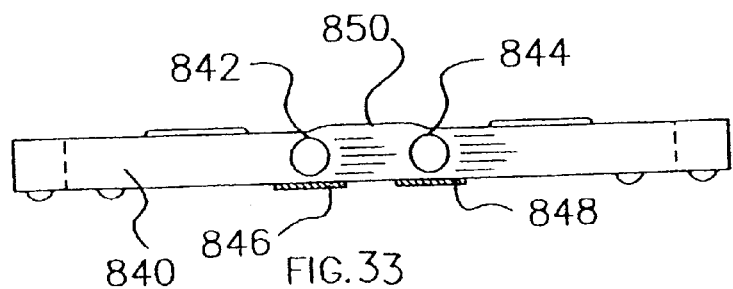

FIGS. 29–33 illustrate alternate configurations to the foregoing bridges, providing variations to the heretofore disclosed spring element or bridge. In FIG. 29 the multi beam load cell 800 has a modified inverted triangle cutout as a bridge 802. The strain gage 804 is placed directly below the single step 806. The elliptical beam load cell 810 of FIG. 30 uses a circular cutout for the bridge 812. The strain gage 814 is placed at the underside of the load cell 810, opposite the singular step 816. The elliptical load cell 820 of FIG. 31 utilizes dual steps 826 and 828 positioned on either side of the circular cutout bridge 822. The strain gage 824 is placed on the underside of the load cell 820 below the bridge 822. For applications requiring extreme accuracy, such as in the medical field, dual strain gage sets are used to average the weight changes. In FIG. 32 an oval cutout is used in the elliptical load cell 830 for the bridge 832. Dual strain gage sets 834 and 836 are placed within the bridge 832 on either side of the step 838. Multi-load cell 840 of FIG. 33 has dual circular cutout bridges 842 and 844 placed at either end of the step 850. The strain gage sets 846 and 848 are placed below the bridges 842 and 844 on the underside of the load cell 840.

The embodiments disclosed in FIGS. 29 and 32 offer the advantage of the placement of a hermetic seal for ultimate protection against moisture. FIGS. 30, 31 and 32 provide the advantage of a lower production cost. The circular cutout designs are drilled which reduces machining time. Any of the foregoing combinations can be used in conjunction with one another to produce the optimum elliptical beam load cell for each individual application.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A stand free multi-beamed load cell for use in monitoring and registering weight changes, said multi-beamed load cell having:
   at least two beams, said at least two beams forming a rim surrounding an open center, said rim having a width and first surface, a second surface and depth there between;
   at least two tabs, said at least two tabs being positioned along said rim, each of said tabs being equally spaced along said rim from other tabs;
   at least two securing members, said securing members being approximately centered within each of said tabs and maintaining said second surface of each of said two tabs proximate a support surface;
   at least two pair of balance members, each of said pair of balance members extending beyond said second side plane of said tabs to maintain said load cell above said support surface;
   at least one bridge, said at least one bridge being a cavity within said beam to reduce said depth of said beam to enable said beam to flex under the application of weight to said first surface,
   at least one strain gage, said at least one strain gage being proximate said bridge to register the flexing of said beams,
   electronic connector means, said electronic connector means connecting said strain gage to control means,
   wherein said balance members minimize deflection on the tabs and rim proximate said tabs to create maximum strain level at said bridge and enable said tabs to accommodate for variations in the level of the support surface.

2. The load cell of claim 1 wherein each of said at least two balance members comprises a pair of spaced bearing receiving areas on said second side of each of said tabs and at least two ball bearings, a first portion of said ball bearings being dimensioned to friction fit within said bearing receiving areas and a second portion of said ball bearings extending beyond said bearing receiving areas.

3. The load cell of claim 2 wherein said bearing receiving areas are recessed within said tabs a distance less than the circumference of said ball bearings.

4. The load cell of claim 2 wherein said securing member further comprises:
   at least a pair of fastener receiving areas, each of said fastener receiving areas being proximate, and extending through, the center of said tabs;
   a pair of fasteners, said fasteners having ahead and a body, said head having a diameter greater than said body, said body being dimensioned to fit within said fastener receiving areas;
   a pair of springs, said pair of springs being dimensioned to be retained between said fastener head and said fastener receiving area;
   a pair of fastener engaging areas, said fastener engaging areas being positioned within said support surface to receive said pair of fasteners;
   wherein said securing member maintains said load cell on said support surface and said spring maintains said ball bearings in contact with said securing brace, during the mounting procedure thereby allowing for surface variations between said tabs and said support surface and preventing warpage of said multi-beam load cell during mounting.

5. The load cell of claim 3 wherein said securing member further comprises counter-bores, said counter-bores being within said first surface and in communication with said fastener receiving areas and having a diameter sufficient to receive said fastener head.

6. The load cell of claim 4 wherein said spring is recessed within said counter-bores and maintained within said counter-bores by said fastener heads.

7. The load cell of claim 1 wherein each of said at least two pair of balance members is a pair of dowel pins extending beyond said second side of each of said tabs, said dowel pins prevent said load cell to come in contact with said support surface.

8. The load cell of claim 1 further comprising load mounting device, said load mounting device having a load containing area having a periphery and load rods, said load rods extending beyond said periphery and dimensioned to interact with said at least one bridge, wherein said at least one bridge receives said load rods and maintains said mounting device suspended within said open center, thereby concentrating said weight at said bridge proximate said strain gauge.

9. The load cell of claim 7 wherein said load mounting device is a platform.

10. The load cell of claim 7 wherein said load mounting device is a container.

11. The load cell of claim 10 comprising a pair of opposing load rods, said load rods interacting with said bridge to suspend said container within said open area, thereby enabling said container to remain horizontal based on gravity rather than alignment of said support surface.

12. A stand free multi-beamed load cell for use in monitoring and registering weight changes, said multi-beamed load cell having:
   at least two beams, said at least two beams forming a rim surrounding an open center, said rim having a width and first surface, a second surface and depth there between;
   at least two tabs, said at least two tabs being along said rim, each of said tabs being equally spaced along said rim from other tabs,
   at least two securing systems, said at least two securing systems affixing each of said at least two tabs to a support surface and comprising at least a pair of fastener receiving areas, each of said fastener receiving areas being proximate, and extending through, the center of said tabs;

counter-bores, said counter-bores being within said first surface and in communication with said fastener receiving areas and having a diameter greater than said fastener receiving areas;

at least a pair of fasteners, each of said fasteners having a head and a body, said head having a diameter greater than said body, and being dimensioned to fit within said fastener receiving areas;

a pair of springs, said pair of springs being dimensioned to be retained within said counter-bores by said fastener head;

a pair of threaded fastener engaging areas, said fastener engaging areas being threaded in said support surface;

at least two pair of balance members, each of said pair of balance members being positioned at said second side of said tabs to maintain said load cell above said support surface, said balance member being a pair of bearing receiving areas within said second side of each of said tabs and at least two ball bearings, a first portion of said ball bearings being dimensioned to friction fit within said bearing receiving areas and a second portion of said ball bearings extending beyond said bearing receiving area, at least one bridge, said at least one bridge being a cavity within said beam reducing the depth of said rim and being configured to receive a load mounting device having load rods that extend into and balance within said bridge to concentrate said weight at said bridge, at least one strain gage, said at least one strain gage being proximate said bridge to register the weight changes placed upon said load cell, electronic connector means, said electronic connector means connecting said strain gage to control means, wherein said balance members minimize deflection on the tabs and rim proximate said tabs, creating maximum strain level at said bridge.

13. A method of monitoring and registering weight changes using a stand free multi-beamed load cell, said multi-beamed load cell having:

at least two beams, said at least two beams forming a rim surrounding an open center, said rim having a width and first surface, a second surface and depth there between;

at least two tabs, said at least two tabs being positioned along said rim, each of said tabs being equally spaced along said rim from other tabs, at least two securing systems, said securing systems maintaining said second surface of each of said two tabs proximate a support surface, each of said securing systems having at least a pair of fastener receiving areas, each of said fastener receiving areas being proximate, and extending through, the center of said tabs;

a pair of fasteners, said fasteners having ahead and a body, said head having a diameter greater than said body, said body being dimensioned to fit within said fastener receiving areas;

a pair of springs, said pair of springs being dimensioned to be retained between said fastener head and said fastener receiving area;

a pair of fastener engaging areas, said fastener engaging areas being positioned within said support surface to receive said pair of fasteners;

at least two pair of balance members, each of said pair of balance members extending beyond said second side plane of said tabs to maintain said load cell above said support surface;

at least one bridge, said at least one bridge being a cavity within said beam to reduce said depth of said beam to enable said beam to flex under the application of weight to said first surface, at least one strain gage, said at least one strain gage being proximate said bridge to register the flexing of said beams;

electronic connector means, said electronic connector means connecting said strain gage to control means;

load mounting device, said load mounting device having a load containing area having a periphery and load rods, said load rods extending beyond said periphery and dimensioned to interact with said at least one bridge, said at least one bridge receiving said load rods to maintains said mounting device suspended within said open center and enable maximum placement of said weight at said strain gauge, comprising the steps of:
 a. placing said balance members of said load cell on said support surface, said balance members preventing contact between said load cell and said support surface;
 b. placing said fasteners through said spring;
 c. placing said fasteners into said fastener receiving areas,
 d. securing said fasteners to said fastener engaging area to maintain said balance members in contact with said support surface;
 e. placing said load rods of said load mounting device within said bridge;
 f. suspending said load mounting device within said open center;
 g. taring said load mounting device weight;
 h. placing material to be monitored in said load mounting device;
 i. registering said weight of said material, said weight being concentrated at said bridge to increase accuracy.

14. The method of claim 13 further comprising the steps of altering the amount of material and registering the changes in said weight.

* * * * *